US006282071B1

(12) United States Patent
Jackson

(10) Patent No.: US 6,282,071 B1
(45) Date of Patent: Aug. 28, 2001

(54) FREQUENCY DEPENDENT X-RAY PROTECTION FOR A MULTIMEDIA MONITOR

(75) Inventor: David Ross Jackson, Indianapolis, IN (US)

(73) Assignee: Thomson Licensing, S.A. (FR)

( * ) Notice: Subject to any disclaimer, the term of this patent is extended or adjusted under 35 U.S.C. 154(b) by 0 days.

(21) Appl. No.: 09/436,273

(22) Filed: Nov. 8, 1999

(51) Int. Cl.$^7$ .................................................. H02H 3/18
(52) U.S. Cl. .......................... 361/86; 361/91.1; 361/91.2
(58) Field of Search ................. 361/78, 86, 91.1, 361/91.2, 91.5, 18; 323/273–276, 284–285; 324/546, 547; 315/411; 348/730

(56) References Cited

U.S. PATENT DOCUMENTS

| 3,660,753 | 5/1972 | Judd et al. . | |
|---|---|---|---|
| 4,052,676 | 10/1977 | Crittenden . | |
| 4,090,111 | 5/1978 | Suzuki . | |
| 4,113,909 | 9/1978 | Beasley | 428/116 |
| 4,148,954 | 4/1979 | Smarook | 428/116 |
| 4,149,209 | * 4/1979 | Stark, Jr. | 361/91.5 |
| 4,164,389 | 8/1979 | Beasley | 425/406 |
| 4,213,166 | * 7/1980 | Watanabe | 361/86 |
| 4,264,293 | 4/1981 | Rourke | 425/407 |
| 4,269,586 | 5/1981 | Ronayne | 425/407 |
| 4,315,050 | 2/1982 | Rourke | 428/116 |
| 4,343,028 | 8/1982 | Hicks . | |
| 5,430,596 | * 7/1995 | Hamaguchi et al. | 361/86 |
| 5,784,231 | * 7/1998 | Majid et al. | 361/18 |
| 5,923,173 | 7/1999 | Yu . | |
| 5,949,633 | * 9/1999 | Conway | 361/38 |

FOREIGN PATENT DOCUMENTS

| 0297846 | 1/1989 | (EP) . |
| 0520141 | 12/1992 | (EP) . |

OTHER PUBLICATIONS

Japanese Patent Abstract, JPO8256298A, K. Tadayoshi, X–Ray Protection Device for Television Receiver with PIP, Oct. 1996.
Japanese Patent Abstract, JPO7327144A, Y. Kazuhiko, X–Ray Protection Circuit for Video Equipment, Dec. 1995.
Japanese Patent Abstract, JP61189075A, W. Tsutomu, X–Ray Protection Circuit, Aug. 1986.
Japanese Patent Abstract, JP06339039A, N. Shigeru et al., X–Ray Protecting Circuit for CRT, Dec. 1994.
MM101 Technical Manual, p. 116–117, 1999, Thomson Consumer Electronics, Technical Training Department, (No Month).
Patent Abstracts of Japan, vol. 1995, No. 03, Apr. 28, 1995 & JP 06339039 (Sharp Corp.), Dec. 6, 1994.
Patent Abstracts of Japan, vol. 1998, No. 02, Jan. 30, 1998 & JP 09261954 (Aiwa Co.), Oct. 3, 1997.
Patent Abstracts of Japan, vol. 011, No. 119, Apr. 14, 1987 & JP 61267480 (Hitachi Ltd.), Nov. 27, 1986.
Search Report for EP Application No. 00403009.4–2207, Mar. 02, 2001.

* cited by examiner

*Primary Examiner*—Michael J. Sherry
(74) *Attorney, Agent, or Firm*—J. S. Tripoli; J. J. Laks; J. J. Kolodka

(57) ABSTRACT

A frequency compensation circuit influences an X-radiation protection (XRP) circuit in a high voltage regulator circuit for a cathode ray tube (CRT) to operate properly under varying frequencies of voltage energizing a high voltage transformer. The frequency compensation circuit includes an input to a source of first voltage related to a high voltage output of the high voltage regulator circuit, a voltage source generator responsive to a high voltage generator frequency of the CRT. A voltage controlled circuit is responsive to the voltage source generator for controlling conveyance of the first voltage to the XRP circuit so that a relatively constant proportion of the high voltage output is reported to the XRP circuit under varying high voltage generator frequencies.

25 Claims, 2 Drawing Sheets

FREQUENCY DEPENDENT X-RAY PROTECTION FOR A MULTIMEDIA MONITOR

BACKGROUND

This invention relates generally to video displays for multiple video modes and, more particularly, to x-ray protection for cathode ray tube displays.

Protection against generation of harmful X-radiation from a cathode ray tube (CRT) includes an X-ray protection (XRP) circuit that compares a sense voltage, representative of an ultor voltage, against a reference voltage. Generation of the ultor voltage is disabled when the sense voltage is greater than the reference voltage. Accuracy of the XRP circuit to disable generation of the ultor voltage at a proper level relies on the sense voltage maintaining a predetermined relationship to the ultor voltage. This relationship is influenced by the relationship between beam current and ultor voltage. As indicated by the high voltage versus beam current curves 15 or 16 in FIG. 1, the slope or impedance is steeper at low beam current than at high beam current.

Figure 1:
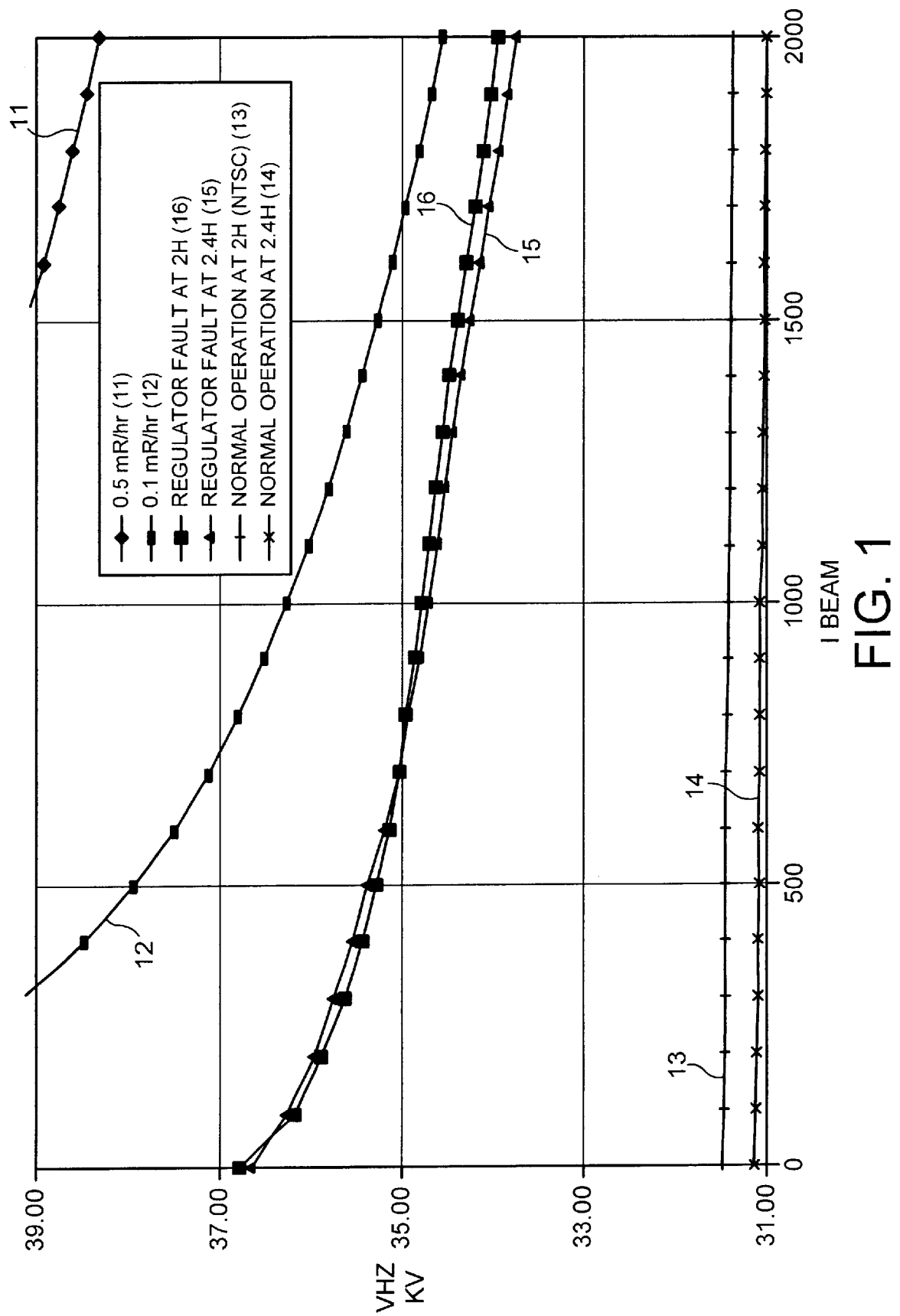

In monitor or CRT display applications the beam current and ultor voltage are maintained below the CRT's isodose curve. The isodose curve defines variations in ultor voltage and corresponding beam current at an anode of the CRT for a relatively constant level of X-radiation by the CRT. The isodose curve is a trip curve in that when beam current and ultor voltage are above the isodose curve the XRP circuit disables generation of the ultor voltage. As observed from FIG. 1, isodose curves 11 and 12 define high voltage VHV in kilovolts (kV) versus beam current (Ib) in microamps for X-radiation levels of 0.5 mR/hr (milliroentgen per hour) and 0.1 mR/hr, respectively. The CRT is operated so that its ultor voltage and corresponding beam current coincide below a particular isodose trip curve to avoid a particular level of X-radiation. Although reduced light output has, in the past, been acceptable in computer monitor applications, in television applications maximum light output is the goal and the high voltage is regulated to operate the CRT as close as possible to its isodose curve and improve the focus at high beam currents.

In a television or monitor a secondary winding, conventionally referred to as an X-ray protection winding, on the high voltage transformer develops a voltage VXRP as the primary of the transformer is driven by a pulse voltage waveform at a particular frequency related or synchronized to the video signal's horizontal scan frequency. The voltage VXRP develops with an amplitude that is proportional to the ultor voltage applied to a CRT's anode. The relationship between the ultor voltage and XRP voltage remains relatively constant over a given range of beam current when the transformer is driven by a pulse at a constant frequency.

Various video signal modes have different horizontal frequencies that require different high voltage generator frequencies at which the transformer is energized. High voltage generators incorporating scan-independent high voltage systems can have variable generating frequencies. The standard definition NTSC signal, high definition ATSC signal, and computer generated SVGA signal have the following respective horizontal frequencies, 15.734 kHz (1H), 33.670 kHz (2.14H), and 37.880 kHz (2.4H). Selection to a higher horizontal frequency signal will require driving the high voltage transformer with a pulse voltage waveform at a higher frequency. For example, in the NTSC broadcast signal mode, the high voltage generator is synchronized to the horizontal scan frequency but operated at 2H or 31.468 kHz, and in the SVGA monitor mode the high voltage generator is locked to the 37.880 kHz (2.4H) video signal frequency.

The high voltage transformer which develops the ultor voltage and voltage VXRP operates with a frequency dependent impedance. As frequency of the voltage energizing the transformer increases the inductive coupling to the secondary winding developing the ultor voltage becomes much more lossy than the inductive coupling to the secondary winding developing the voltage VXRP. Known frequency dependent transformer losses in the inductive couplings between the primary winding and secondary windings may include losses due to inter-winding capacitance and eddy current effects. Energy is dissipated during the charge and discharge of inter-winding capacitance between winding layers of the transformer. At a greater energizing frequency the effects of inter-winding capacitance are more pronounced. Also, at higher frequencies known skin effects occur in which conductors appear to have a higher AC resistance from current crowding at the surface of the conductor. With multiple winding conductors skin effects are more pronounced at greater energizing frequencies. Although these and other types of known transformer losses will vary with transformer construction, the losses will be greater with increases in frequency at which the transformer is energized.

To compensate for the increased loss in inductive coupling producing the ultor voltage and maintain a relatively constant ultor voltage, as frequency increases the pulse voltage driving the primary winding of the transformer is boosted to maintain the ultor voltage relatively constant. Since the inductive coupling to the secondary winding developing the voltage VXRP is not as lossy as that for developing the ultor voltage, voltage VXRP increases as the primary voltage energizing the transformer is increased to maintain the ultor voltage level. As a result, voltage VXRP increases relative to the ultor voltage and cannot be used directly to monitor and determine fault levels in ultor voltage over changes in frequency.

SUMMARY

In accordance with an inventive arrangement there is provided a high voltage circuit comprising: a high voltage generator; first means for developing a first signal representative of the high voltage; second means for developing a second signal indicative of a frequency of operation of the high voltage generator; and third means coupled to the first and second means and responsive to the second signal indicative of the frequency of operation for detecting a fault operation of the high voltage generator in accordance with the frequency of operation.

In accordance with a different inventive arrangement there is provided a cathode ray tube display operable under varying transformer energizing frequencies. The display includes a high voltage transformer having a primary winding for being energized by a voltage at the transformer energizing frequency and a secondary winding comprising a tertiary winding for supplying a high voltage to provide an anode accelerating potential to a cathode ray tube and a protection winding for developing a voltage that is in proportion to the high voltage, the proportion to the high voltage changing according to changes in the transformer energizing frequency. The display further includes a protection circuit responsive to changes in the transformer energizing frequency for disabling normal energization of the primary winding when the proportion of high voltage exceeds a reference voltage as the transformer energizing frequency changes.

In accordance with another inventive arrangement there is provided a high voltage power supply circuit for supplying a high voltage to provide anode accelerating potential in a cathode ray tube. The power supply circuit includes a transformer with primary winding and secondary winding including both a tertiary winding and protection winding; a generator circuit for energizing the primary winding with a pulse voltage at a generator frequency to produce both the high voltage across the tertiary winding and a protection voltage across the protection winding in proportion to the high voltage, proportion of the protection voltage to the high voltage varying with changes in the generator frequency; and a protection circuit responsive to changes in the generator frequency for developing a sense voltage from the protection voltage that is representative of the high voltage over variations in the generator frequency.

DRAWINGS

Figure 2:
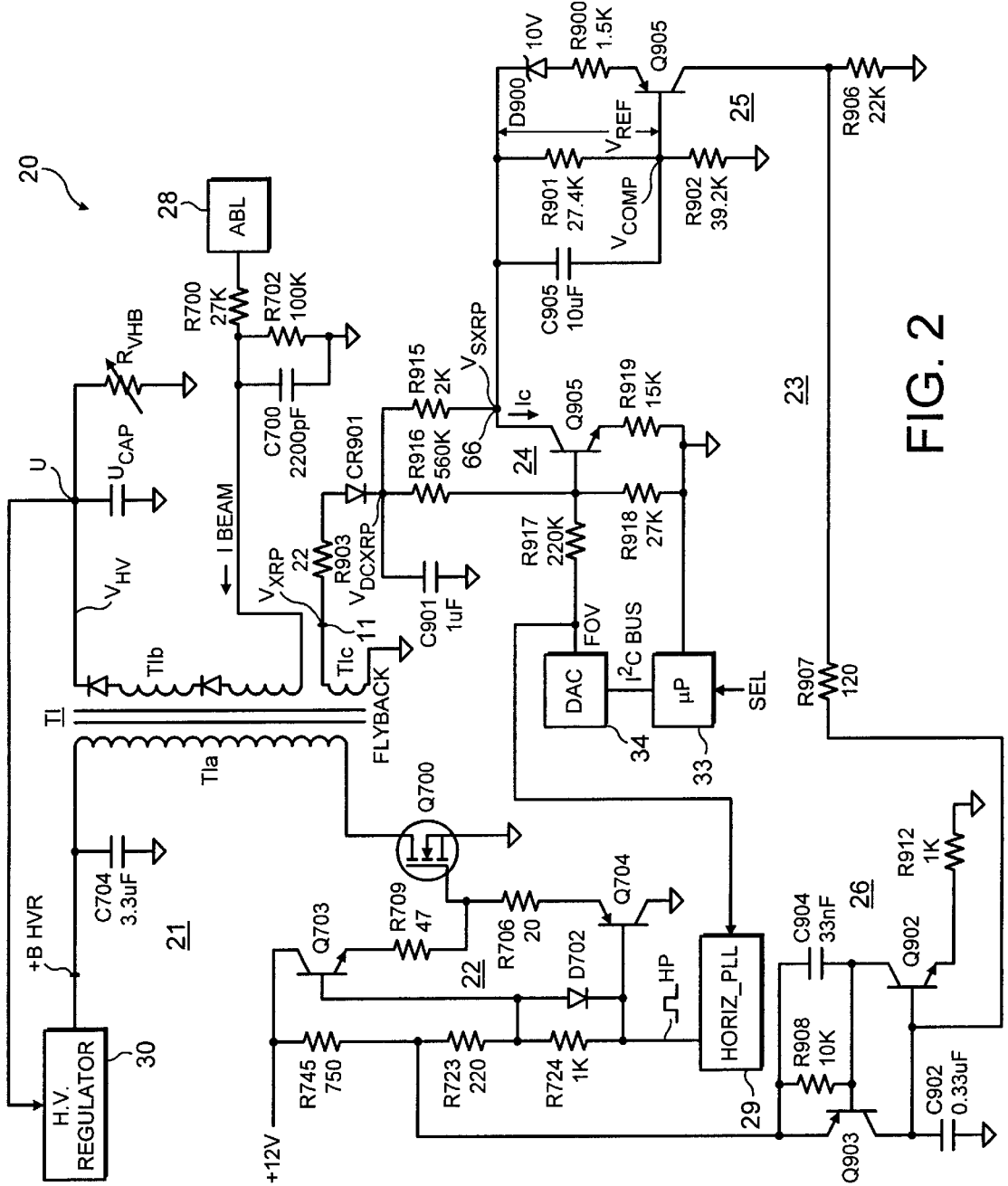

FIG. 1 is a graph of CRT isodose curves 11, 12 at two different X-radiation levels, power curves 13, 14 under normal operation and power curves 15, 16 representing trip levels under fault conditions, where the X-ray protection circuit is adjusted by an inventive frequency compensation circuit; and FIG. 2 is a circuit schematic of a high voltage power supply circuit for a CRT display employing an X-ray protection circuit with an inventive frequency compensation adjustment.

DESCRIPTION OF THE PREFERRED EMBODIMENT

An X-ray protection (XRP) circuit for a single video mode application detects a voltage VXRP that is constant in proportion to the ultor voltage, over a given range of beam current level. The constant relationship between the voltage VXRP and ultor voltage permits use of the voltage VXRP detected to indirectly monitor the level of ultor voltage and disable generation of the ultor voltage when a threshold is exceeded. In a multiple video scan frequency application an increase in frequency of voltage energizing the transformer is accompanied by an increase in voltage VXRP relative to the ultor voltage. As this frequency increases the transformer's losses are more pronounced and the voltage energizing the transformer is boosted to maintain a relatively constant ultor voltage. Voltage VXRP increases as the primary voltage is increased to maintain the ultor voltage constant. As a result, voltage VXRP increases relative to the ultor voltage and cannot be directly sensed to monitor and disable generation of the ultor voltage when a threshold level is surpassed by the voltage VXRP.

An exemplary high voltage power supply circuit 20 according to FIG. 2 employs an XRP circuit 23 that includes an inventive frequency compensation circuit 24 to control coupling of a voltage VDCXRP to a fault comparator circuit 25 so that a sensed voltage VSXRP at a terminal 77 is representative of an ultor or high voltage VHV developed by a secondary winding T1b, over increases in frequency of the voltage energizing primary inding T1a of a high voltage transformer. The high voltage power supply circuit 20 is depicted with exemplary circuit component values in which resistor values are in ohms unless designated with "k" indicating kilo-ohms, and capacitor values are in microfarads designated with "uF" and in nanofarads designated with "nF".

A conventional high voltage regulator 30 supplies a voltage +B HVR, filtered by capacitor C704, to primary winding T1a. The +B HVR voltage is pulsed by controlled switching of an FET transistor Q700 to energize primary winding T1a. When current in primary winding T1a is switched off energy in winding T1a is inductively transferred to secondary windings T1b and T1c which develop a DC high voltage VHV and a pulse voltage VXRP, respectively. High voltage VHV, commonly referred to as ultor voltage, is applied to ultor terminal U of the CRT comprising a capacitive load UCAP and variable impedance load RVHB. Resistive load RVHB varies in accordance with changes in image brightness displayed by the CRT.

The high voltage VHV developed by secondary winding T1b is fed back to the regulator 30 so that the +B HVR voltage can be varied for changes in load to maintain a relatively constant high voltage VHV. Load changes presented by the variable resistive load RVHB of the CRT cause changes in beam current Ibeam through secondary winding T1b. A conventional automatic beam current limiter (ABL) 28 operates to limit beam current Ibeam through the ultor terminal U to the CRT's anode. The ABL 28 clamps beam current Ibeam at a maximum DC current level. When a high level of beam current Ibeam is drawn through secondary winding T1b, the sampled beam current voltage across a capacitor C700 and a resistor 702 is reduced and is coupled to ABL 28 by a resistor R700 to cut back beam current.

Switching of transistor Q700 is controlled by push-pull operation of transistors Q703 and Q704 in high voltage generator circuit 22. The +12 V regulated supply is dropped across a voltage divider comprising resistors R745, R723 and R724 to bias set the base terminals of transistors Q703 and Q704 and bring diode D700 into forward conduction. Voltage drops across resistors R706 and R709 stabilize push-pull operation as temperature variation of base-emitter voltages in either Q703 or Q704 does not cause current to rise very rapidly.

Transistor Q700 is driven with a square wave of approximately 50% of the period, locked to horizontal scan frequency by a conventional phase-lock loop circuit (Horiz__PLL) 29, that generates a pulse waveform BP. The Horiz__PLL synchronizes operation of the high voltage generator circuit 22 to the horizontal scan frequency. The Horiz__PLL timing is modified by a frequency offset voltage fov provided by a digital-to-analog converter (DAC) 34. The DAC 34 is responsive to a microprocessor ($\mu$p) 33 communicating over an IIC a digital signal over an bus indicative of a user selected (SEL) video mode. For example, changing from an ATSC high definition mode to an SVGA monitor mode changes the horizontal scan frequency from 33.670 kHz (2.14H) to 37.880 kHz (2.4H), thereby increasing the voltage fov to adjust the Horiz__PLL 29 so that switching of transistor Q700 is changed from 33.670 kHz and locked to 37.880 khz. In NTSC mode, however, transistor Q700 is driven at 31.968 kHz (2H) while the Horiz__PLL is locked to the broadcast scan frequency of 15734.26 kHz (1H), which is too low to generate the desired high voltage VHV.

As the high voltage VHV is developed by the secondary winding T1b a voltage VXRP is developed by the other secondary winding T1c inductively coupled to primary winding T1a. For a constant frequency at which primary winding T1a is energized the high voltage VHV and pulse VXRP generally maintain a constant relationship to each other, over a given beam current level range, as the inductive coupling relationships between primary winding T1a and secondary windings T1b and T1c remain constant. This generally constant relationship allows the voltage VXRP to be representative of the high voltage VHV.

The secondary voltage VXRP is filtered and rectified, by the combination of resistor R903, capacitor C901 and diode CR901, to provide a half-wave voltage VDCXRP to the XRP circuit 23. The XRP circuit 23 operates to disable operation of the high voltage generator circuit 22 when the high voltage VHV reaches a fault level. The XRP circuit 23 comprises an inventive frequency compensation circuit 24, a fault comparator circuit 25, and a latch circuit 26. The comparator circuit 25 detects a fault operation of the high voltage generator circuit 22 by detecting a fault level in the high voltage VHV and enables the latch circuit 26 to disable the high voltage generator circuit 22 from energizing the transformer TI. A portion of the voltage VDCXRP is dropped across resistor R915 of the frequency compensation circuit 25 to provide a sense voltage VSP at terminal 66 coupled to the fault comparator circuit 25.

Under a constant frequency at which winding T1a is energized the voltage VDCXRP, and also the sense voltage VSXRP, maintains a generally constant relationship with the high voltage VHV, over a given range of beam current Ibeam level. Transistor Q901 which is normally off operates as the XRP circuit 23 switch to disable generation of high voltage VHV. The rectified sense voltage VSXRP is filtered by capacitor C905, divisionally dropped across resistors R901 and R902, and coupled to the emitter leg of transistor Q901, which includes diode D900 and resistor R900. If the high voltage VHV begins to increase than voltage VXRP, as well as voltage VDCXRP and sense voltage VSXRP, increases proportionally and continues to be representative of the high voltage VHV level. It is noted that at low beam currents, the proportion does change somewhat relative to high beam currents Ibeam.

If the sense voltage VSXRP increases enough, in correspondence with an increase in high voltage VHV, to drop a voltage Vcomp, between divider resistors R901 and R902, above a reference voltage Vref developed across zener diode D900, resistor R900 and emitter-base junction of transistor Q901, than transistor Q901 is switched on. Collector current from Q901 is voltage divided between resistor pair R906 and R907 to turn on transistor Q902 in latch circuit 26.

With transistor Q902 turned on, voltage developed between resistors R746 and R723 in the high voltage generator circuit 22 is drawn across resistor R908 and capacitor C904 to bias transistor Q903 on, while the emitter leg of transistor Q902 dissipates current in resistor R912. As transistor Q903 turns on it provides a low impedance path through C902 to the reference potential for the base drive signal from the Horiz_PLL 29. As a result, switching of transistor Q700 ceases and generation of high voltage VHV is disabled. Once transistors Q902 and Q903 are switched on they remain on until the regulated supply voltage +12V is removed. Alternatively, the XRP circuit can change the frequency of horizontal operation to make the CRT not viewable.

A problem with conventional XRP circuits, without the inventive frequency compensation circuit 24, occurs when the frequency at which the transformer is energized varies. At greater energizing frequencies, transformer losses discussed above increase and the voltages VXRP, VDCXRP and VSXRP increase relative to the high voltage VHV. If the fault comparator circuit 25 is configured to detect a proper fault level in the high voltage VHV based on a certain relationship between sense voltage VSXRP and high voltage VHV, then increasing the energizing frequency will produce an increase in VSXRP relative to VHV and may cause premature or nuisance tripping by the XRP circuit. Conversely, decreasing the energizing frequency will reduce the sense voltage VSXRP relative to the high voltage VHV and may result in operation of the XRP circuit 23 with a disabling or trip curve above an isodose curve level.

Adjustment by the XRP circuit 23 to changes in frequency at which primary winding T1a is energized is accomplished with an exemplary inventive frequency compensation circuit 23. The compensation circuit shown is a common-emitter type transistor circuit with gain controlled by emitter current from transistor Q905 through resistor R919. As frequency changes the frequency offset voltage fov changes accordingly to bias transistor Q905 as needed. If the frequency increases, for example, than the offset voltage fov will increase, and in tandem with an increased voltage VDCXRP dropped between voltage divider resistors R916 and R917 the fov will bias transistor Q905 to draw more collector current Ic. In response to increased collector current Ic a greater amount of voltage VDCXRP is dropped across resistor R915 so as to provide a sense voltage VSXRP in proportion to and representative of the high voltage VHV Without the frequency compensation, sense voltage VSXRP would be higher relative to the high voltage VHV and the fault comparator circuit would prematurely detect a high voltage VHV fault. In the case of an increase in frequency, for example, without adjusting the dissipation of VDCXRP across resistor R915, trip curves 15 or 16 (FIG. 1) might reside lower than as shown and cause nuisance tripping. In the case of a decrease in frequency, without adjusting the dissipation of VDCXRP across resistor R915, sense voltage VSXRP will decrease relative to the high voltage VHV and place trip curves 15 or 16 higher than shown in FIG. 1, and possibly above isodose curve 12.

At whatever frequency and corresponding relationship between high voltage VHV and sense voltage VSXRP the fault comparator circuit 25 is configured for proper high voltage VHV fault detection, the inventive frequency compensation circuit 24 adjusts coupling of the voltage VDCXRP to the comparator circuit 25 to provide over varying frequencies a sense voltage VSXRP in proper relationship to the high voltage VHV.

The above frequency compensation is applicable to high voltage generators that incorporate both horizontal scan driven high voltage systems or scan-independent driven high voltage systems. Also, the present frequency compensation can be applied to other situations where transformer pulse amplitudes do not frequency track high voltage.

For CRT applications involving multiple transformer energizing frequencies in which voltage operation is significantly below the CRT's isodose curve, the XRP circuit can be operated to detect an ultor voltage fault, i.e. when ultor or high voltage at a corresponding beam current is above the CRT's normal operating point, at the lowest frequency of operation. At higher transformer energizing frequencies the XRP circuit can detect an ultor voltage fault at a lower ultor voltage than at a lower frequency. For smaller CRT's, such as those used in projection televisions and smaller multimedia monitors, the desired high voltage operative point can be very close to the CRT's isodose curve and variation in the ratio of ultor voltage to voltage VXRP can be minimized.

What is claimed is:

1. A high voltage circuit comprising:
   a high voltage generator;
   first means for developing a first signal representative of a high voltage developed in response to said high voltage generator;
   second means for developing a second signal indicative of a frequency of operation of said high voltage generator; and third means coupled to said first and second means and responsive to said second signal indicative of said frequency of operation for detecting a fault operation of said high voltage generator in accordance with said frequency of operation.

2. A high voltage circuit according to claim 1, wherein said third means comprises a digital-to-analog converter providing a voltage varying according to changes in said frequency.

3. A high voltage circuit according to claim 2, wherein said third means comprises a microprocessor providing to said digital-to-analog converter a digital sequence indicative of a video signal horizontal scanning frequency related to said frequency of operation.

4. A high voltage circuit according to claim 1, wherein said first means comprises a high voltage transformer for developing a voltage from which said first signal is derived and said high voltage in to said high voltage generator energizing said transformer at said frequency of operation.

5. A high voltage circuit according to claim 1, wherein said third means comprises an amplifier circuit responsive to said second signal for drawing an increasing amount of current from said first means in accordance with increases in said frequency for providing a voltage related to said first signal.

6. A high voltage circuit according to claim 5, wherein said third means comprises a transistor having a terminal controlled by said second signal from said second means to influence current draw from said first means for providing a voltage related to said first signal through said transistor in accordance with changes in said frequency.

7. A high voltage circuit according to claim 1, wherein said third means comprises a common emitter transistor circuit with a transistor having its collector terminal coupled across a first resistor to both said first means and a comparator means and a base terminal influenced by said second signal from said second means to control proportions of a voltage related to said first signal that are dropped across said first resistor and coupled to said comparator means.

8. A high voltage circuit according to claim 1, wherein said first means comprises a transformer with a primary winding, a tertiary winding for developing said high voltage and a secondary winding for developing said first signal as a voltage in response to said high voltage generator energizing said primary winding.

9. A high voltage circuit according to claim 1, wherein said third means comprises a frequency compensation means and a comparator means, said frequency compensation means coupling a portion of voltage related to said first signal to said comparator means, said portion of voltage having a predetermined relationship to said high voltage.

10. A high voltage circuit according to claim 1, wherein said third means comprises a feedback to said high voltage generator for disabling said high voltage generator at said fault operation.

11. A cathode ray tube display operable under varying transformer energizing frequencies, said display comprising:
a high voltage transformer having a primary winding for being energized by a voltage at said transformer energizing frequency and a secondary winding comprising a tertiary winding for supplying a high voltage to provide an anode accelerating potential to a cathode ray tube and a protection winding for developing a voltage that is in proportion to said high voltage, said proportion to said high voltage changing according to changes in said transformer energizing frequency; and
a protection circuit responsive to changes in said transformer energizing frequency for disabling normal energization of said primary winding when said proportion of high voltage exceeds a reference voltage as said transformer energizing frequency changes.

12. A display according to claim 11, wherein said protection circuit is responsive to changes in said transformer energizing frequency by sensing a relatively constant proportion of said high voltage as said voltage developed by said protection winding changes in response to changes in said transformer energizing frequency.

13. The cathode ray tube display according to claim 11, wherein said transformer energizing frequency is related to a horizontal scanning frequency of a video mode under which said display is operated.

14. The cathode ray tube display according to claim 13, wherein said protection circuit comprises a voltage generator providing a frequency control voltage related to said horizontal scanning frequency and influencing said protection circuit to convey to a comparator circuit a relatively constant proportion of said high voltage under varying horizontal scanning frequencies as said voltage developed by said protection winding increases.

15. A cathode tube display according to claim 13, wherein said protection circuit comprises a digital-to-analog converter responsive to a digital sequence indicative of said horizontal scanning frequency.

16. A cathode ray tube display according to claim 11, wherein said protection circuit comprises a transistor circuit responsive to an increase in said transformer energizing frequency for sensing a relatively constant proportion of said high voltage during changes in said transformer energizing frequency.

17. A cathode ray tube display according to claim 11, wherein said protection circuit comprises a transistor with a collector terminal coupled over a first resistor to said protection winding and a base terminal coupled to a source of frequency control voltage indicative of said transformer energizing frequency, said transistor being responsive to an increase in said frequency control voltage for developing more voltage across said first resistor by an increase in current from said voltage developed by said protection winding.

18. A cathode ray tube according to claim 12, wherein said protection circuit comprises a frequency compensation circuit coupled to said protection winding and comparator circuit for conveying to said comparator circuit a part of said voltage developed across said protection winding that is a relatively constant proportion to said high voltage while said horizontal scanning frequency changes.

19. A high voltage power supply circuit for supplying a high voltage to provide anode accelerating potential in a cathode ray tube, said power supply circuit comprising:
a transformer with primary winding and secondary winding including both a tertiary winding and protection winding;
a generator circuit for energizing said primary winding with a pulse voltage at a generator frequency to produce both said high voltage across said tertiary winding and a protection voltage across said protection winding in proportion to said high voltage, proportion of said protection voltage to said high voltage varying with changes in said generator frequency; and
a protection circuit responsive to changes in said generator frequency for developing a sense voltage from said protection voltage that is representative of said high voltage over variations in said generator frequency.

20. The power supply circuit according to claim 19, wherein said protection circuit comprises a frequency compensation circuit coupled to said protection winding and a comparator circuit for controlling dividing of said protection voltage between said frequency compensation circuit and said comparator circuit so as to couple to said comparator circuit of portion of said protection voltage representative of said high voltage while said generator frequency varies.

21. The power supply circuit according to claim 19, wherein said protection circuit comprises a latch circuit for disabling said generator circuit in response to said portion of said protection voltage.

22. The power supply circuit according to claim 20, wherein said frequency compensation circuit comprises a digital-to-analog converter responsive to changes in said generator frequency for providing a frequency voltage indicative of said generator frequency.

23. The power supply circuit according to claim 22, wherein said frequency compensation circuit comprises a linear gain amplifier circuit responsive to said digital-to-analog converter to control conveying of said protection voltage so as to maintain the proportion of high voltage coupled to said comparator circuit relatively constant.

24. The power supply circuit according to claim 23, wherein said linear gain amplifier comprises a transistor with its base terminal biased by said frequency voltage signal related to said generator frequency to control dividing of said protection voltage between a resistor coupled to a collector of said transistor and said comparator circuit.

25. The power supply circuit according to claim 19, wherein said protection circuit comprises a comparator circuit for developing a reference voltage which when exceeded causes said comparator circuit to disable generation of said high voltage in response to said sense voltage.

* * * * *